2,799,670
Patented July 16, 1957

2,799,670

METHOD OF PREPARING CYSTEINYLGLYCINE

Louis Laufer and Marcia Gutcho, New York, N. Y., assignors, by mesne assignments, to the United States of America as represented by the Secretary of the Navy No Drawing. Application April 13, 1954,
Serial No. 423,007

1 Claim. (Cl. 260—112)

This invention pertains to improvements in the method of preparing the dipeptide cysteinylglycine, the therapeutical properties of which are well known.

Glutamic acid has been split from glutathione by heating water solutions containing 15 mg./ml. for 120 hours at 62° C., as reported by Kendall, Mason and MsKenzie in J. Biol. Chem., 88, 409 (1930). Hydrolysis at 90° C. in 0.2–0.5 N $H_3PO_4$ or 1.2 N HCl for one hour is effective, according to the reports of Binkley and co-workers presented in J. Biol. Chem., 186, 159 (1950) and in J. Biol. Chem., 186, 731 (1950). However, such hydrolysis did not succeed in isolating the reaction products, the conclusions being drawn from indirect assays only.

The method of Binkley reported in J. Biol. Chem., 186, 159 (1950) provided a solution of suitable concentration for chromatography: A batch of 250 mgs. of glutathione was dissolved in 9 ml. of water, one ml. of 12 N HCl added, and the solution heated in a boiling water bath for one hour. The resulting hydrolyzate was used to screen a series of thirteen solvent systems, using glutamic acid, glutathione and cysteine as controls, with N-ethyl maleimide coupling at pH 2 used in all cases. The following table shows that n propanol (70%) $H_2O$ (30%) gave the best resolution of these compounds.

(Symbols used: CG—cysteinylglycine; GSH—glutathione; CSH—cysteine; GA—glutamic acid; CDG—cystinyldiglycine).

TABLE I

Screening of solvents for separation of cysteinylglycine (CG) from GSH, cysteine and glutamic acid (GA)

| No. | Time (hrs.) | Solvent front (cm.) | GA | $R_f$ GSH | CSH | CG | Hydrolyzate + | GA |
|---|---|---|---|---|---|---|---|---|
| 1 | 6 | 20.5 | .56 | .71 | .73 | .75 | + | .58 |
| 2 | 22 | 21 | .47 | .51 | .62 | .63 | + | .44 |
| 3 | 22 | 25.5 | .28 | .67 | .92 | .88 | + | .28 |
| 4 | 22 | 28.5 | .12 | .18 | .40 |  | streak |  |
| 5 | 22 | 26 | .10 | .10 | .35 | .28 | + | .10 |
| 6 | 22 | 24.5 | .20 | .31 | .56 | .44 | + | .21 |
| 7 | 22 | 22 | .12 | .12 | .39 | .34 | + | .12 |
| 8 | 22 | 26 | 0+.04 | 0+.04 | .12 | 0+.04 | + | .12 |
| 9 | 22 | 23 | 0 | 0 | 0+.02 | 0 | + | .02 |
| 10 | 22 | 26.5 | .01 | .01 | .12 | 0 | + | .07 |
| 11 | 22 | 23.5 | 0 | 0 | .08 | 0 | + | .07 |
| 12 | 22 | 19.5 | .20 | .18 | .35 | .35 | + | .20 |
| 13 | 22 | 23.5 | .47 | .44 | .62 | .70 | + | .47 |

Description of Solvents:
1. AAU—acetone (60), acetic acid (2.5), water (37.5), urea (p.5 g.).
2. TBF—tertiary butanol (70) formic acid (15), water (15).
3. WSP—water saturated phenol: 500 g. phenol+225 g. water.
4. Isobutyric acid (90) $H_2O$ (10).
5. n Propanol (80) $H_2O$ (20).
6. n Propanol (70) $H_2O$ (30) (NPW).
7. Isopropanol (80) $H_2O$ (20).
8. Isopropanol (90) $H_2O$ (10).
9. Isoamyl alcohol, water saturated.
10. n Butanol, water saturated.
11. Isobutanol, water saturated.
12. Sec. butanol (40) tertiary butanol (10) $H_2O$ (30).
13. n Butanol (50), acetic acid (25), $H_2O$ (25).

The subject invention modifies the above-described methods of Brinkley, Kendall and others, and provides a procedure for the preparation of the dipeptide cysteinylglycine which involves the steps of mild acid hydrolysis of glutathione, the isolation of the cysteinylglycine liberated by hydrolysis as a mercury salt, the decomposition of the mercury salt with hydrogen sulfide, and the precipitation of relatively pure cysteinylglycine (in reduced form) from alcohol.

The effect of varying conditions in each of these steps on the yield and the purity of the cysteinylglycine thus produced is summarized in the following tables, chromatography having been used to follow the extent of hydrolysis and the final purity.

TABLE II

Hydrolysis of GSH to CG

| Conc., GSH Percent | Temp. Cond.[2] | Time, Min. | Acid Used | Relative Intensity on Chromatograms [1] | | | |
|---|---|---|---|---|---|---|---|
| | | | | CG | GSH | CSH | GA |
| 2.5 | W. B. | 75 | 1.8 N $H_2SO_4$ | dk | v. ft | gd | dk. |
| 2.5 | Reflux | 75 | 1.8 N $H_2SO_4$ | dk | v. ft | gd | dk. |
| 5.0 | Reflux | 60 | 1.2 N $H_2SO_4$ | dk | | gd | dk. |
| 5.0 | Reflux | 75 | 1.2 N $H_2SO_4$ | dk | | gd | dk. |
| 5.0 | W. B. | 30 | 1.0 N $H_2SO_3$ | dk | gd | v. ft | dk. |
| 5.0 | W. B. | 45 | 1.0 N $H_2SO_3$ | dk | lt | lt | dk. |
| 5.0 | W. B. | 60 | 1.0 N $H_2SO_3$ | dk | lt | lt | dk. |
| 10.0 | W. B. | 60 | 1.0 N $H_2SO_3$ | dk | lt | lt | dk. |
| 10.0 | W. B. | 60 | 0.9 N $H_2SO_4$ | dk | ft | lt | dk. |
| 10.0 | W. B. | 105 | 0.9 N $H_2SO_4$ | dk | ft | lt | dk. |
| 10.0 | W. B. | 120 | 0.9 N $H_2SO_4$ | dk | | gd | dk. |
| 10.0 | W. B. | 60 | 0.6 N $H_2SO_4$ | dk | lt | lt | dk. |
| 10.0 | W. B. | 120 | 0.6 N $H_2SO_4$ | dk | ft | lt | dk. |
| 5.0 | W. B. | 30 | 0.5 N $H_3PO_4$ | dk | gd | v. ft | [1] lt. |
| 5.0 | W. B. | 45 | 0.5 N $H_3PO_4$ | dk | lt | ft | [1] lt. |
| 5.0 | W. B. | 60 | 0.5 N $H_3PO_4$ | dk | lt | ft | [1] lt. |
| 10.0 | W. B. | 60 | 0.5 N $H_3PO_4$ | dk | lt | ft | [1] lt. |

[1] In order to resolve these components conclusively two solvents, WSP and NPW were used. The combined interpretation is given here. Density of the spots on the chromatograms was estimated visually and recorded, in decreasing order of intensity as: dk., gd., lt., ft., v. ft. NPW is normal propanol 70 parts, water 30 parts.
[2] W. B. is hydrolysis in boiling water bath; Reflux is hydrolysis by refluxing at boil.

TABLE III

Effect of process variables on yield and purity of CG

| Exp. CG | GSH[1] g. used | Hydrolysis | | pH adjusted to— | adjusted with— | Additional Information | Yield Grams | Percent Theor. | Chromatogram of Product | | | |
|---|---|---|---|---|---|---|---|---|---|---|---|---|
| | | Acid | Time Min. | | | | | | CG | GSH | CSH | CDG |
| 1 | 2.5 | $H_2SO_4$ 1.2 N wb | 60 | 2.0 | NaOH | a | 1.15 | 80 | dk | v. ft | ft | v. ft. |
| 2 | 2.5 | HCl 1.2 N wb | 60 | 7.0 | NaOH | a, f | 0.62 | 42 | dk | gd | ft | v. ft. |
| 3 | 2.5 | HCl 1.2 N wb | 60 | 2.0 | NaOH | a | 0.76 | 52 | dk | gd | | v. ft. |
| 4 | 2.5 | $H_2SO_4$ 1.2 N wb | 60 | 2.0 | NaOH | a | Rpt. 0.2 | 14 | dk | ft | ft | |
| 5 | 2.5 | $H_2SO_4$ 1.2 N R | 60 | 2.0 | NaOH | a | 0.55 | 38 | dk | gd | ft | |
| 6 | 2.5 | $H_2SO_4$ 1.2 N R | 60 | 2.0 | NaOH | a | 0.85 | 59 | dk | ft | | gd. |
| 7 | 1 | $H_3PO_4$ 0.5 M wb | 90 | | | b | 0.2 | 35 | dk | ft | | gd. |
| 8 | 5 | $H_2SO_4$ 1.2 N R | 60 | 1.0 | NaOH | b | 2.9 | 84 | dk | ft | gd | gd. |
| 9 | 5 | $H_2SO_4$ 1.2 N R | 90 | 1.0 | NaOH | b, c | 3.8 | [2] 130 | dk | v. ft | ft | v. ft. |
| 10 | 5 | $H_2SO_4$ 2.4 N R | 90 | 1.0 | $Na_2CO_3$ | b, d | 2.4 | 83 | dk | v. ft | gd | v. ft. |
| 11 | 5 | $H_2SO_4$ 2.4 N wb | 75 | 1.0 | $Na_2CO_3$ | b, d | 2.2 | 76 | dk | v. ft | gd | v. ft. |
| 12 | 7 | $H_2SO_4$ 0.6 N wb | 85 | 1.5 | (e) | b, d | 3.4 | 84 | dk | v. ft | ft | |

[1] All solutions 2.5% GSH except No. 12 which was started at 7% and diluted to 2.5% with ice after hydrolysis.
[2] GA present.

Symbols used:
wb. Hydrolysis carried out in boiling water bath.
R. Hydrolysis carried out by refluxing.
a. Hg cake washed until practically $SO_4$ free.
b. Hg cake washed until acid free.
c. Prior to concentration pH adjusted to 3 with $NH_4OH$.
d. Prior to concentration pH adjusted to 3 with $BaCO_3$; this removes $SO_4^=$.
e. Diluted with ice to 2.5% solution; pH not adjusted.
f. Cadmium acetate used precipitant in this experiment.
CDG designates cysteinyle diglycine.

Table II, which is concerned with hydrolysis, demonstrates that two reactions are involved:

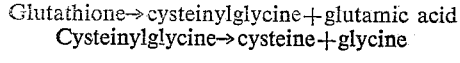

Glutathione → cysteinylglycine + glutamic acid
Cysteinylglycine → cysteine + glycine It is evident that the rates of both of these reactions increased with acid concentration and temperature, although glycine could not be identified on the chromatograms.

When conditions for splitting glutathione completely were established, significant amount of cysteine were formed, with consequent loss of cysteinylglycine and contamination of the final product. The preparative procedure hereinafter described afford a compromise providing minimum quantities of glutathione and cysteine.

In the isolation and treatment of the mercury salts, at levels above pH 1.0 considerable quantities of yellow basic mercuric sulfate and mercaptides formed. Above pH 2.0, glutamic acid coprecipitated and contaminated the final product. Simple washing did not remove free $SO_4^=$ occluded by the mercaptide, but barium treatment of the filtrate after gassing with hydrogen sulfide eliminated this source of contamination. Cysteinylglycine did not crystallize readily from water after vacuum concentration to syrup consistency. The products obtained were generally amorphous and precipitated first as a taffy which had to be hardened by trituration with alcohol. Cysteinylglycine so prepared was extremely hydroscopic.

The method for preparing cysteinylglycine comprised the following steps: a 7% glutathione solution in 0.6 N sulfuric acid solution was hydrolyzed for one hour and twenty five minutes in a boiling water bath. Hydrolysis was then stopped by adding sufficient ice so that the resulting solution was 2.5% glutathione, the provision of a dilute solution being adopted to inhibit the precipitation of impurities. The pH was checked at this point and, when necessary, adjusted to 1–1.5 with solid sodium carbonate. Complete precipitation was obtained by adding twice the calculated amount of mercuric sulfate. (It is believed that the mercury is attached to both the SH and COOH groups. For 7 g. glutathione, 13.6 g. mercuric sulfate was required.) A diatomaceous earth product filter aid was added to the precipitate, which was filtered on a precoat of such filter aid. The precipitate was washed with several liters of water until the pH of the filtrate was about 4. The mercury salt was decomposed with hydrogen sulfide, and the mercury sulfide filtered off. The filtrate was treated with Darco G-60 and all traces of hydrogen sulfide removed by bubbling nitrogen gas through the solution to avoid the formation of colloidal sulfur. Solid barium carbonate was added to adjust the solution to pH 3, this step removing most of the free sulfate as barium sulfate.

The solution was then concentrated by vacuum distillation at a bath temperature of about 50° C. to the consistency of a thick syrup, which was hardened with alcohol. The precipitate was then centrifuged, washed with alcohol and dried in a desiccator. (It is to be noted that cysteinylglycine picks up water from the air readily, so that centrifugation at this point is superior to filtration.)

The foreging procedure gives high yield of a product that is predominantly cysteinylglycine, but which includes, as impurities, traces of cysteine, glutathione and sulfate ion.

Obviously many modifications and variations of the present invention are possible in the light of the above teachings. It is therefore to be understood that within the scope of the appended claim the invention may be practical otherwise than as specifically described.

We claim:

The method of preparing cysteinylglycine comprising the steps of hydrolyzing a 7% glutathione solution in 0.6 N sulfuric acid in a boiling water bath for one hour and twenty-five minutes, adding ice to arrest hydrolysis after substantial dilution of said solution to 2.5% glutathione, adding solid sodium carbonate to adjust the pH to within the limits 1–1.5, precipitating completely by adding twice the calculated amount of mercuric sulfate, adding a diatomaceous earth product filter aid to said precipitate, filtering said precipitate on a precoat of said filter aid, washing the precipitate with water until the pH of the filtrate is about 4, decomposing the mercury salt with hydrogen sulfide and filtering off the mercury sulfide, removing all traces of hydrogen sulfide by bubbling nitrogen gas through said filtrate adding solid barium carbonate to adjust the solution to pH 3 and thereby remove most of the free sulfate as barium sulfate, concentrating the solution to the consistency of a thick syrup by vacuum distillation, hardening the concentrate with alcohol, centrifuging and washing the precipitate with alcohol, and drying said precipitate in a desiccator.

References Cited in the file of this patent

Consden et al., Biochem. J., Vol. 46, page 17 (1950)
Fodor et al., J. Biol. Chem., Vol. 202, pages 552–3 (1953)